United States Patent
Burtea (10) Patent No.: US 7,026,579 B2
(45) Date of Patent: Apr. 11, 2006

(54) FOOD PREPARATION OVEN HAVING QUARTZ HEATERS

(75) Inventor: Constantin Burtea, Lindenhurst, IL (US)

(73) Assignee: Q-Matic Technologies, Inc., Gurnee, IL (US)

( * ) Notice: Subject to any disclaimer, the term of this patent is extended or adjusted under 35 U.S.C. 154(b) by 0 days.

(21) Appl. No.: 10/833,796

(22) Filed: Apr. 28, 2004

(65) Prior Publication Data

US 2005/0242077 A1   Nov. 3, 2005

(51) Int. Cl.
  *A21B 1/48* (2006.01)
  *F27B 9/36* (2006.01)

(52) U.S. Cl. ............... 219/388; 219/411; 99/443 C (58) Field of Classification Search ........... 219/388, 219/411–414; 99/386, 443 C
See application file for complete search history.

(56) References Cited

U.S. PATENT DOCUMENTS

| | | | |
|---|---|---|---|
| 3,087,418 A * | 4/1963 | Albright | 99/386 |
| 3,152,535 A * | 10/1964 | Pollak, Jr. et al. | 99/386 |
| 3,249,741 A * | 5/1966 | Mills | 219/388 |
| 3,262,383 A * | 7/1966 | Sturman | 99/386 |
| 3,384,497 A * | 5/1968 | Gassmann | 99/443 C |
| 4,389,562 A * | 6/1983 | Chaudoir | 219/388 |
| 4,554,437 A * | 11/1985 | Wagner et al. | 219/388 |
| 5,086,694 A * | 2/1992 | Stuck et al. | 99/443 C |
| 5,197,375 A * | 3/1993 | Rosenbrock et al. | 219/388 |
| 5,441,035 A * | 8/1995 | Liang-Chieh | 126/21 R |
| 5,821,503 A * | 10/1998 | Witt | 219/388 |
| 6,069,345 A * | 5/2000 | Westerberg | 219/411 |
| 2002/0000290 A1* | 1/2002 | Crump et al. | 156/245 |

FOREIGN PATENT DOCUMENTS

JP         60-47665 A  *  3/1985

* cited by examiner

*Primary Examiner*—Joseph Pelham
(74) *Attorney, Agent, or Firm*—Joseph P. Krause; Ladas & Parry LLP (57) ABSTRACT

Food is heated in an oven using multiple planar, electrically-heated quartz heaters. A variable speed conveyor controls the time that the food is exposed to the infrared energy. A controllable power supply adjusts heat output from the heaters by controlling the duty cycle delivered to the planar quartz heaters.

16 Claims, 7 Drawing Sheets

FOOD PREPARATION OVEN HAVING QUARTZ HEATERS

BACKGROUND OF THE INVENTION

A fast food restaurant oven should meet several requirements. It should be energy efficient to reduce operating costs but should also be fast heating to maximize sales. The ability to cook or heat many different types of foods is also important in order to support menu variety. Installation and maintenance costs should be minimized.

Prior art gas-fired radiant ovens are less expensive to fuel because gas is currently less costly than electric energy on a cost per unit energy basis but gas ovens require more expense to install and are less efficient than electrically-powered ovens. A gas supply line must be installed, a vent is required to carry away products of combustion and because much of the heat is wasted, gas ovens over time might prove to be more costly to operate. A principal drawback of a gas-fired oven however is the time required to bring the oven up to an operating temperature. When used in a fast-food restaurant, gas fired ovens are often left on so as to keep the oven temperature high enough to prepare foods. A fast, energy efficient, rapid-heating oven that does not require venting or a gas supply line would be an improvement over the prior art.

DETAILED DESCRIPTION OF THE PREFERRED EMBODIMENTS

Figure 1:
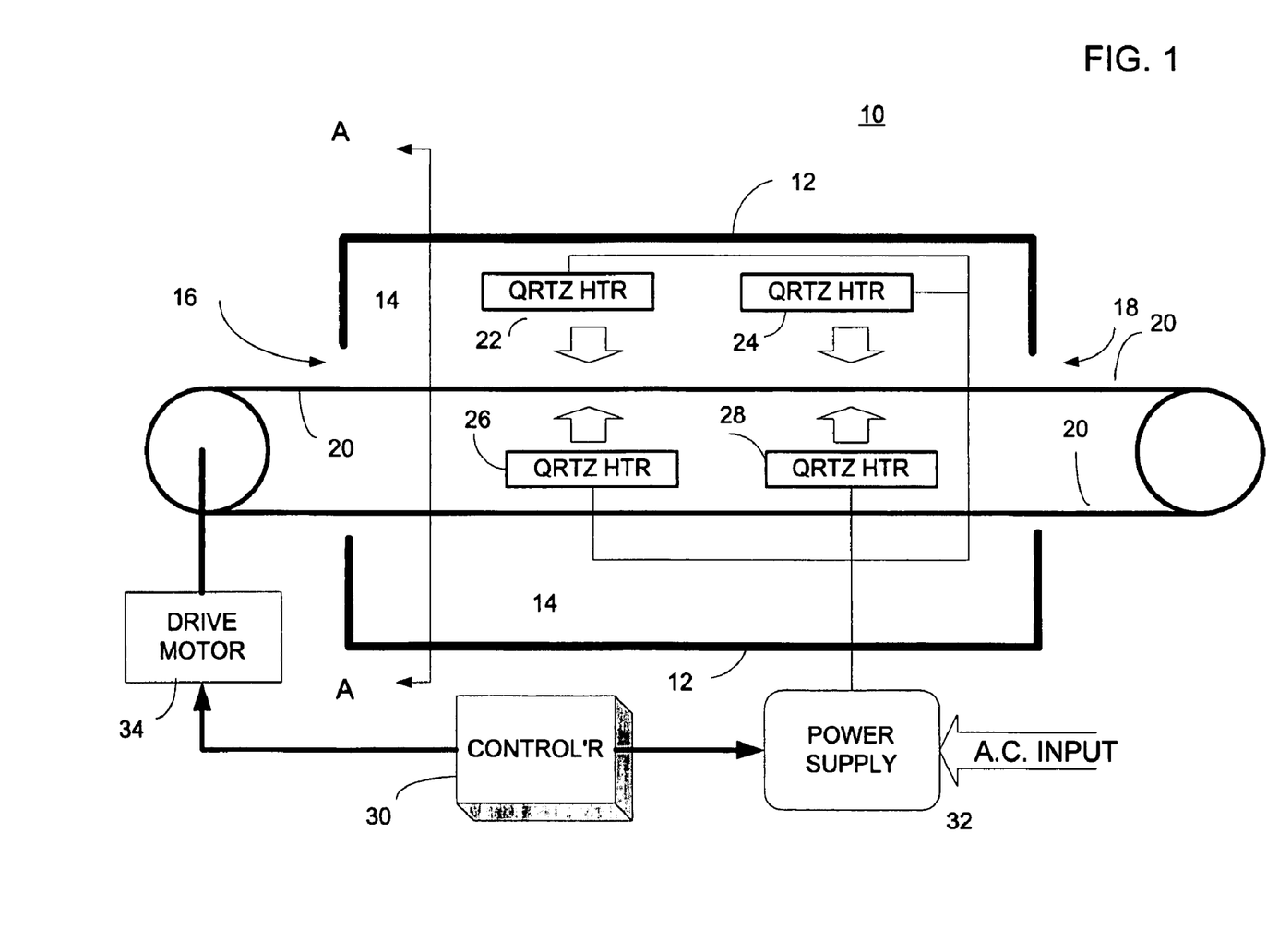
FIG. 1 is a cross-sectional diagram of the preferred embodiment of the food preparation oven having quartz heaters.

FIG. 1 shows a cross-sectional view of a preferred embodiment of an electrically-powered food preparation oven 10. The oven 10 is comprised of a housing 12, the interior of which defines a heating cavity 14. The heating cavity 14 is preferably thermally insulated to keep heat from being conducted through the walls of the oven housing 12. Insulation on the heating cavity 14 is not shown for clarity. In a preferred embodiment, the housing 12 is substantially rectangular.

Access into the heating cavity 14 is provided through dual, opposed openings 16 and 18 in the housing 12. In the embodiment shown in FIG. 1, a variable speed conveyor 20 extends through both openings and carries food items through the heating cavity 14 as they are being heated. In an alternate embodiment shown in FIG. 7, which is discussed below, the conveyor 20 does not extend through the openings 16 and 18 but approaches the openings or is "proximate" to one or both of them.

The variable speed conveyor 20 preferably extends through the input or first opening 16 but also past the output or second opening 18 so that food items to be cooked or heated can be placed directly onto one end of conveyor 20, carried into the oven heating cavity 14 through the first end 16 and exit the opposite end 18 after being heated conveyor 20.

In preferred embodiment, the conveyor 20 is a variable speed conveyor, the speed of which is controlled by a variable speed drive motor 34. This drive motor is operatively coupled to a controller 30 which is capable of controlling the motor speed to change the speed at which the conveyor rotates through the oven 10. Alternate embodiments of the invention include using a single-speed motor or using a multi-tap motor that is capable at running at several, discrete speeds but not a variable speed.

Those of ordinary skill in the art now that variable speed motors can be embodied with different technologies. D.C. motors are but one type of motor, the speed of which can be easily controlled from zero revolutions per minute up to the design limit of the motor. Other variable speed motors are known to those of skill in the art.

The conveyor's speed can be specified in feet or inches per minute or, by the amount of time required for the conveyor to rotate a full loop, e.g., in seconds per revolution. In the preferred embodiment, the conveyor speed was continuously variable from 15 seconds per revolution to approximately 30 minutes. An alternate embodiment of a "variable speed" conveyor has its speed incrementally adjustable, e.g., 15 seconds per revolution; 30 seconds/revolution; 60 seconds/revolution, etc. For purposes of claim construction, the term "variable speed" should be construed to include continuously variable speed as well as two or more discretely different speeds, such as those produced by A.C. induction motors.

Whether the motor is truly variable speed, i.e., substantially continuously variable, or can run at several different speeds, motor speed control is accomplished using a controller 30. The controller 30 can be implemented using a microprocessor, microcontroller, combinational and sequential logic, an application specific integrated circuit or a field programmable gate array, all of which should be considered to be a "controller" that is capable of controlling the motor speed or the output speed of the drive motor 34. A simple rotary switch can be used to control the speed at which multiple winding motors operate and in such an embodiment, the term "controller" should be construed to include a switch.

Rapid-heating and energy-efficient food preparation is accomplished by the oven by using quartz heaters to heat the food. In FIG. 1, four separate electrically powered quartz heaters 22, 24, 26 and 28 are mounted (not shown in the figures) within the heating cavity 14. Quartz heaters generate both radiant heat and infrared heat, however, most of their heat output is infrared, which can be directed and which is directed in the oven, directly into food items carried past the heaters 22, 24, 26 an 28 on the variable speed conveyor 20.

As shown in FIG. 1, first and second electrically powered planar quartz heaters 22 and 24 are located within the heating cavity 14 and mounted to the housing 12 (mounting not shown) to be positioned above the conveyor 20 such that when electrical energy is supplied to them, their heat is directed downward and at right angles to the conveyor and therefore at right angles to a food item that is carried on the conveyor past the quartz heaters 22 and 24.

Because the heaters 22, 24, 26 and 28 are planar, a maximum amount of heat is directed into the food product as it passes between the heaters. Because the heaters are planar, relatively little of the heat output energy is lost in a radial direction, i.e., away from the food below the heaters, as happens in prior art heaters.

FIG. 1 shows first and second electrically powered planar quartz heaters 26 and 28 that are substantially directly opposite the upper heaters 22 and 24. The lower heaters 26 and 28, which are considered to be opposed to the upper heaters, 22, and 24, are located within the heating cavity 14, but within the loop of the conveyor 20, such that these lower quartz heaters 26 and 28 direct radiant heat and infrared heat upward, orthogonal to the conveyor and into food items on the conveyor 20.

In the preferred embodiment, the planar quartz heaters 22, 24, 26 and 28 are opaque quartz planar heaters, models QP and QH and available from Solar Products, Inc., 228 Wanaquy Avenue, Pompton Lakes, N.J. 07442. The Q-series panel heaters have a grooved, fused translucent quartz emitter surface plate in which a precision wound resistance wire, (i.e., not planar and not ribbon shape) is looped. When the wire is heated, the quartz panel gets hot but also transmits infrared heat. The Q-series heaters have a heat output of up to 93 kw/m$^2$.

Heat intensity adjustment in the oven 10 is accomplished by adjusting the power provided to the quartz heaters 22, 24, 26 and 28. In a preferred embodiment, the power supply 32, which is shown in FIG. 1 to be directly coupled to each of the heaters, which provides a controllable duty-cycle AC voltage to the quartz heaters. The maximum heat output of 93 kilowatts per square meter is obtained from the heaters using a 100% duty cycle. By shortening the duty cycle, the heat output of the quartz heaters can be almost instantaneously reduced to accommodate the heating requirements of different food items.

Adjustable duty cycle power supplies are well known to those of ordinary skill in the art. In the preferred embodiment, the power supply 32 is also controlled by the controller 32. Accordingly, the controller 30 can adjust both the drive motor 34 output speed and the power supply output power so as to match the cooking requirements of different food items placed on the conveyor belt 20 for cooking. For example, a relatively higher drive motor 34 speed and a shorter duty cycle will provide less cooking energy and less cooking time to food items that require little heat. Conversely, slowing of the drive motor speed and increasing the duty cycle of the power supply can be used to provide hotter heat and a longer cooking time.

A distinct advantage of using quartz heaters is that the heat output is predominantly infrared. Because the infrared energy is supplied using electrical power, a flue vent to carry away products of combustion is not required. In addition, the nearly 100% energy efficiency of electric heat is substantially higher than is achievable by gas-fired ovens. Finally, and perhaps most importantly, the quartz heaters reach their cooking temperature almost instantaneously when compared to the time required to heat a gas-fired infrared heating element.

Figure 2:
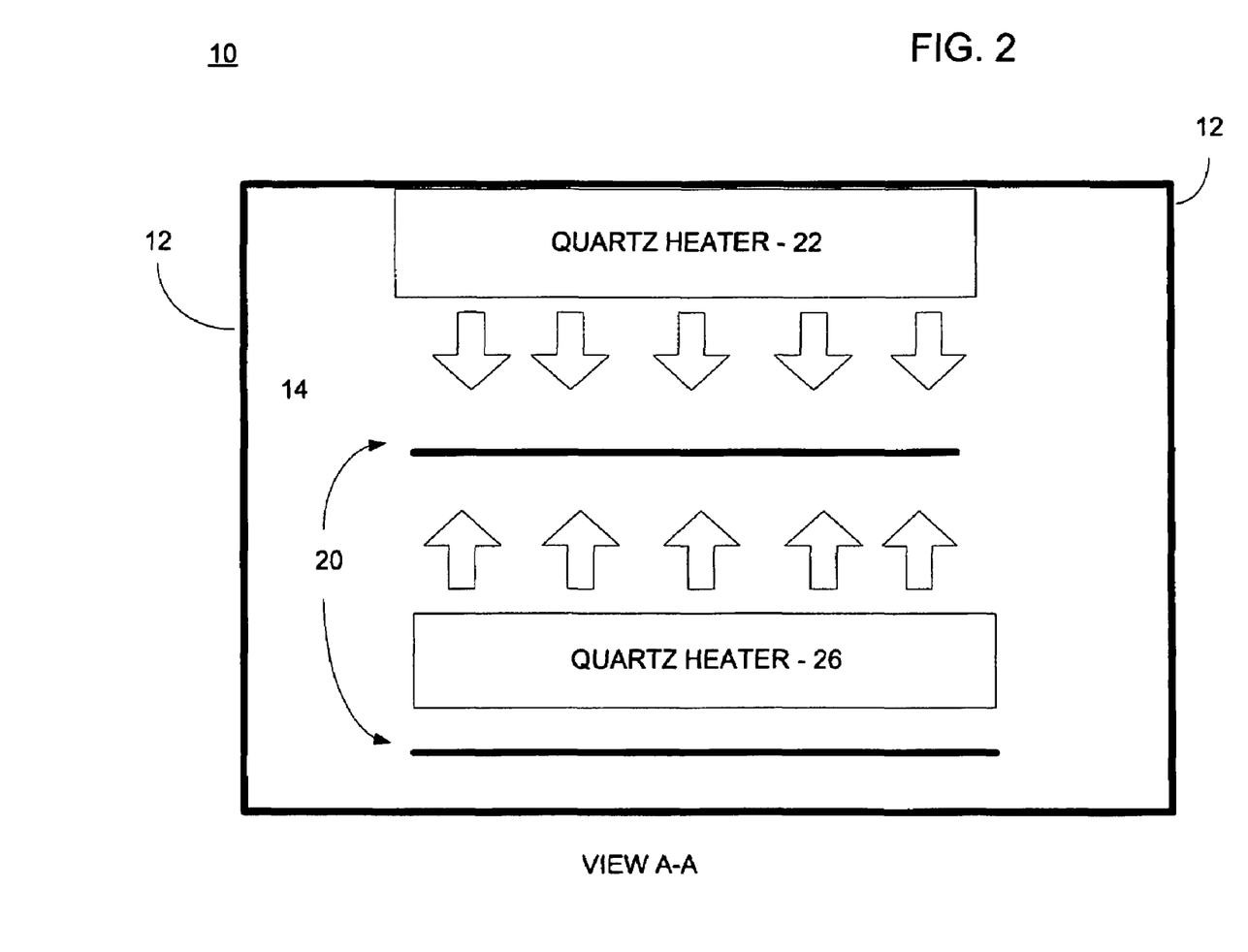
FIG. 2 is a sectional view through section lines AA of FIG. 1 showing the relative location of the quartz heaters in the food preparation oven.

FIG. 2 shows an alternate view of the oven 10 shown in FIG. 1 but taken through section lines AA. It can be seen in FIG. 2 that the quartz heater 22 is directly above the conveyor surface 20 so that its output infrared energy is directed downward toward the "top" of the conveyor 20. A lower quartz heater 26 directs infrared energy upward and into the food items on the belt by its placement in the conveyor loop, which is depicted in FIG. 2 by the upper and lower belts of the conveyor 20.

Figure 3:
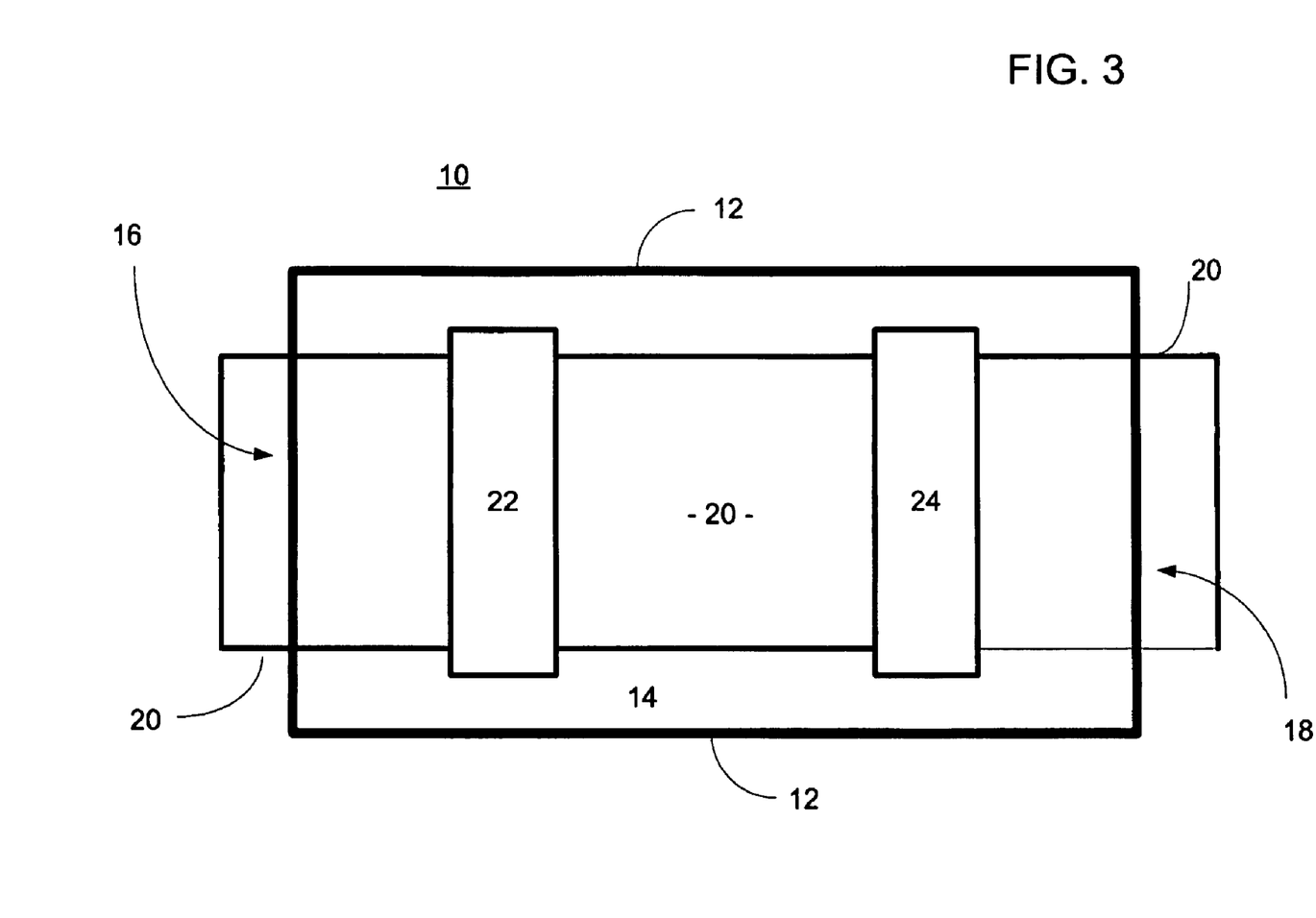
FIG. 3 is a top view of the oven shown in FIG. 1 showing the relative placement of the quartz heaters in the oven.

FIG. 3 is a top view of the oven shown in FIG. 1 showing the relative placement of the heaters 22 and 24 between the first and second openings 16 and 18. FIG. 3 also shows the extension of the conveyor 20 through and past the inlet and outlet openings 16 and 18 of the housing 12.

Figure 4:
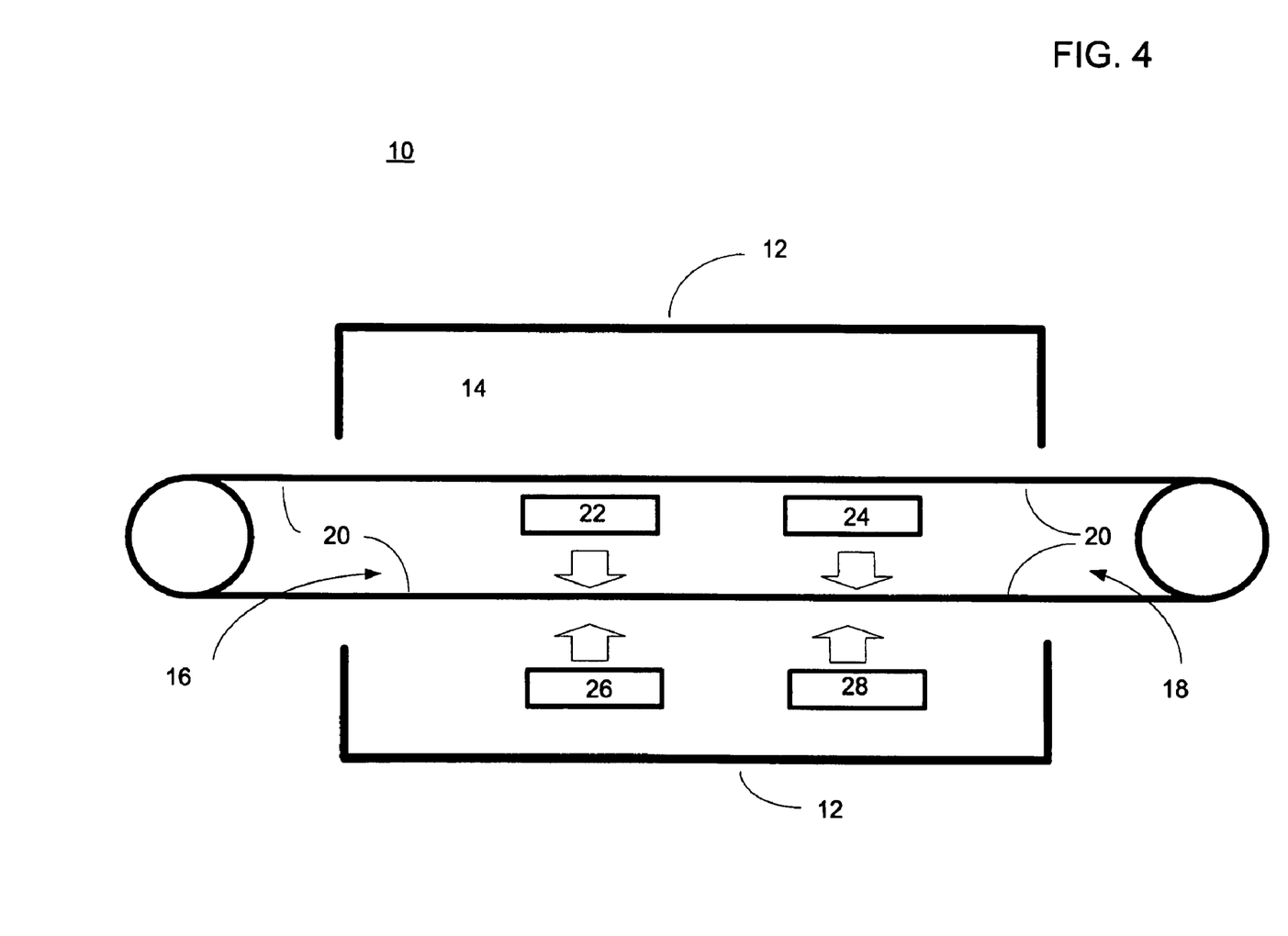
FIG. 4 is a cross-sectional view of a food preparation oven showing an alternate placement of the quartz heaters.
Figure 5:
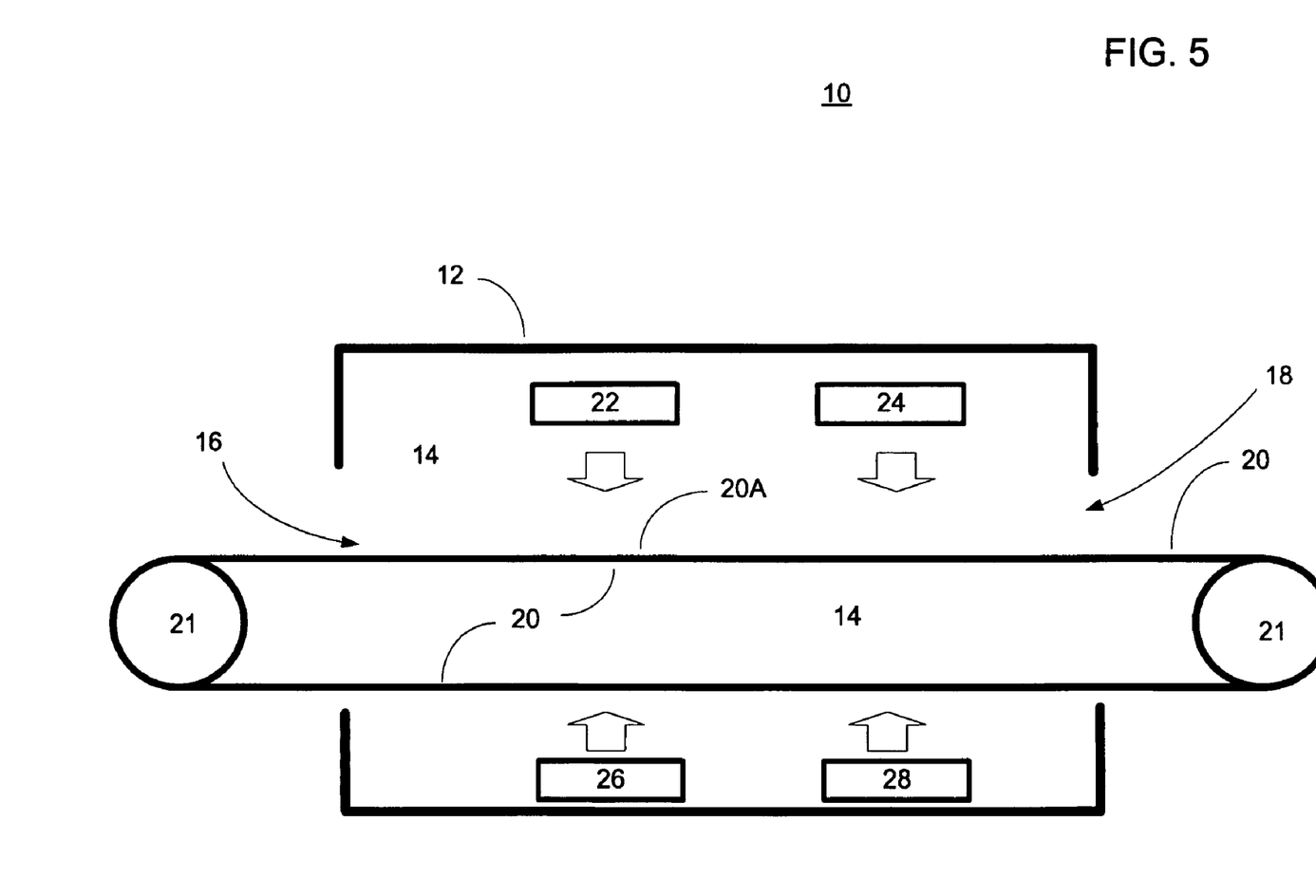
FIG. 5 is another cross-sectional view of the food preparation oven showing yet another alternate embodiment of the quartz heater placement.
Figure 6:
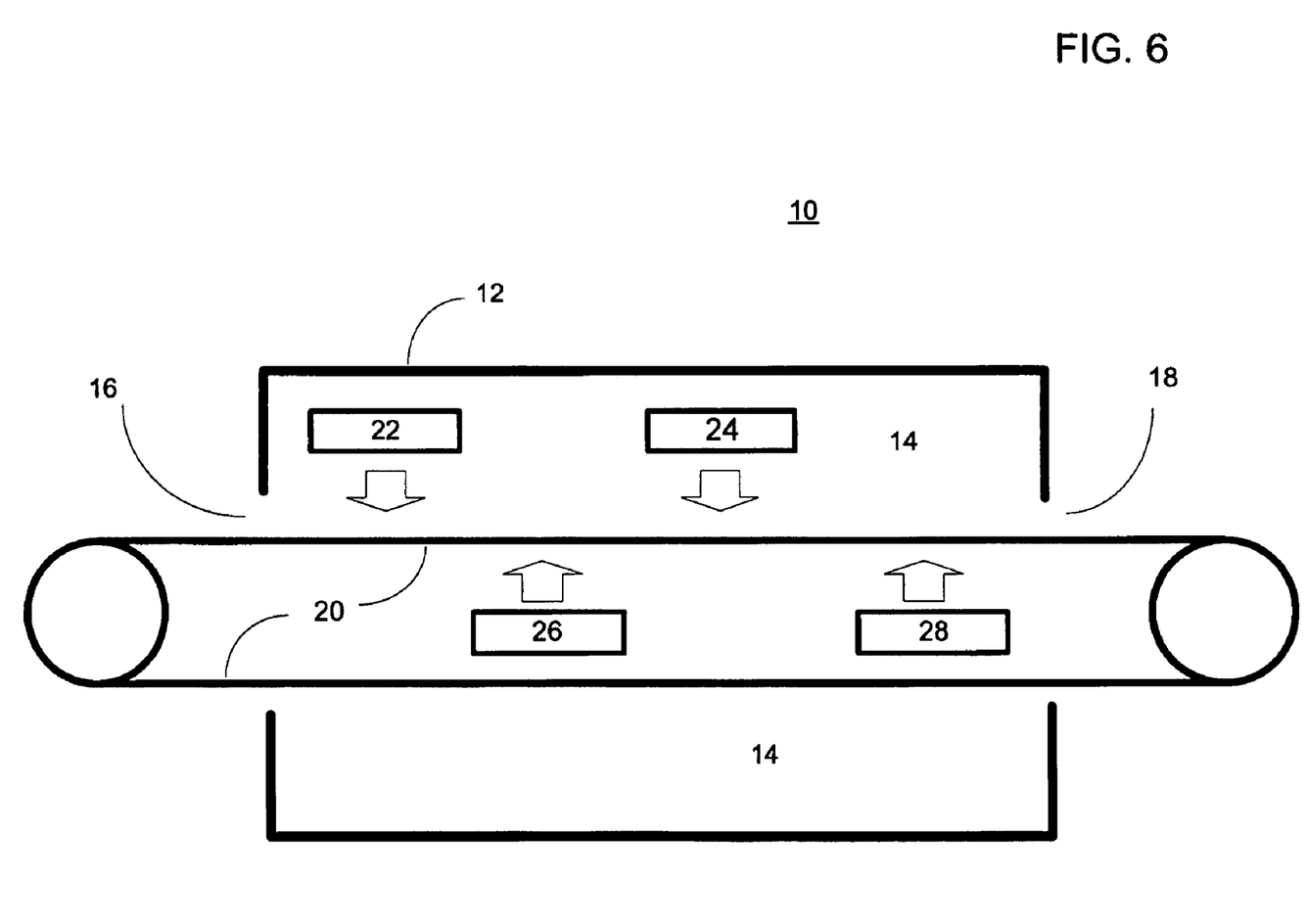
FIG. 6 is another cross-sectional view of a food preparation oven showing yet another alternate placement of quartz heaters.

In FIGS. 4–6, the drive motor 34, the controller 30 and the power supply 32 are not shown for simplicity. In each of the alternate embodiments shown in these figures, a drive motor, controller and power supply would be required.

FIG. 4 shows an alternate placement of the quartz heaters 22, 24, 26 and 28. In the alternate embodiment shown in FIG. 4, the upper heaters 22 and 24 are located "within" the conveyor belt loop 20 and direct their infrared energy downward onto food items that travel through the oven 12 on the lower half of the conveyor 20. In this alternate embodiment, the lower infrared heaters 26 and 28 are completely below or "outside" the conveyor belt. In this figure they are shown as being near the bottom of the oven housing 12.

FIG. 5 shows yet another embodiment of the quartz heater placement. In this figure, all of the quartz heaters 22, 24, 26 and 28 are "outside" the conveyor 20 loop. As shown in the figure, the upper heaters 22 and 24 appear to be farther from the upper part of the loop 20A than do the lower heaters 26 and 28 appear to be. Whether the upper heaters are significantly more distant from the upper part of the loop 20A than the lower heaters will be determined by the size of the oven housing 12 but also by the diameter of one or both of the conveyor sprockets 21. Again, in this figure, the drive motor 34, controller 30, and power supply 32 are omitted for clarity, but would otherwise be connected substantially as shown in FIG. 1.

FIG. 6 shows yet another embodiment of the placement of the quartz heaters. In this embodiment, the quartz heaters are displaced transversely from each other. In other words, the first upper heater 22 is translationally offset to the left of the first lower quartz heater identified by reference number 26. Similarly, the second top quartz heater identified by reference number 24 is offset to the left the second lower quartz heater 28. The translational offset of the quartz heaters as shown in FIG. 6 can provide selective heating of the top and then the bottom of the food item. In yet another embodiment, both of the top heaters 22 and 24 could be transversely displaced from both bottom heaters 26 and 28.

In all of the foregoing embodiments the planar quartz heaters face each other. Their heat output transmission pattern is therefore substantially planar. A substantially planar heat flow is therefore directed into the food with little heat lost to radial transmission away from the food to be heated.

In all of the foregoing embodiments 2 upper heaters and 2 lower heaters are shown. Those of skill in the art will recognize that a single upper heater and/or a single lower heater could be used as well. Similarly, 3, 4 or more heaters could be used in both the upper and lower heating positions.

Figure 7:
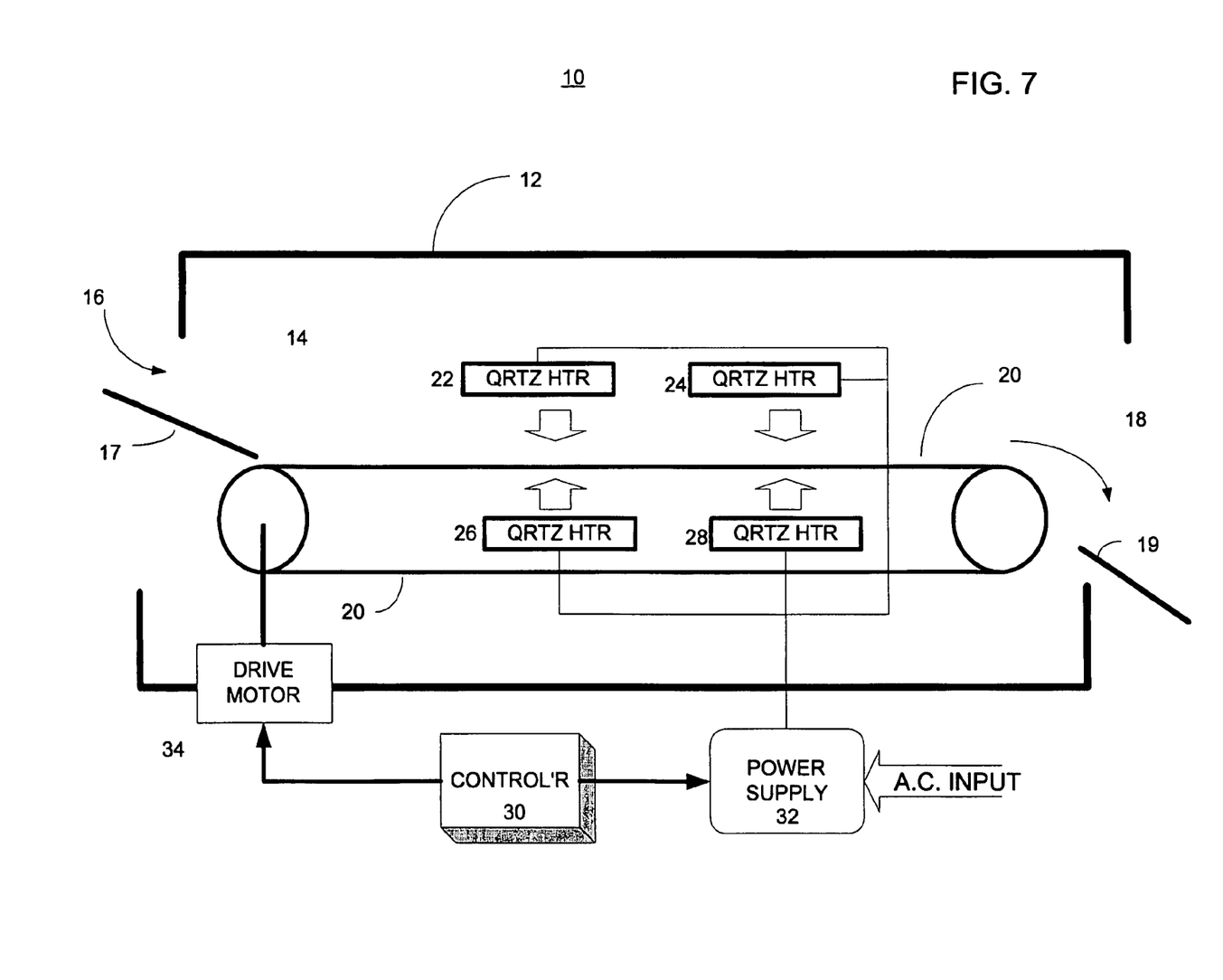
FIG. 7 is a cross-sectional view showing yet another embodiment of the food preparation oven.

FIG. 7 depicts yet another embodiment of an oven 12 for cooking food items. In this embodiment, the first or inlet opening 16 and the second or outlet opening 18 extend past or enclose the conveyor 20. The conveyor 20 extends near or "proximate" the openings 16 and 18. In this embodiment, food items can be put onto the conveyor using an inlet slide or ramp 17. Food items on the ramp 17 slide down the ramp 17 and onto the conveyor 20. Near or proximate the outlet or second end 18, another ramp 19 collects food items as they roll off the top of the conveyor and directs their movement outside the oven for collection and serving.

In all of the foregoing embodiments, cooking control is accomplished by at least one of the drive motor speed and the power input to the quartz heaters. The power delivered to the quartz heaters is adjusted in one embodiment by controlling the duty cycle of the AC current delivered to the quartz heaters. In another embodiment, DC power could be used to heat the quartz heaters by which the output voltage and/or current can be controlled using well-known techniques.

By appropriately controlling the motor speed and the power provided to at least one quartz heater above the food product and another quartz heater below the food product, a fast-heating, energy-efficient food preparation oven can be realized. By using planar quartz heaters, heating efficiency is maximized. Food preparation time is decreased. Energy is saved as is the conduction of waste heat into a kitchen area.

What is claimed is:

1. An oven for cooking food items comprising:
an oven housing defining a heating cavity, said oven housing having first and second opposing openings into the heating cavity;
a conveyor, within the heating cavity and which carries food items through the heating cavity;
a first, electrically powered planar quartz heater, located within the heating cavity and positioned above the conveyer and being located closer to said first opening than it is to said second opening, said first planar quartz heater generating infrared heat and directing said infrared heat downwardly and substantially orthogonal to the conveyor;
a second, electrically powered planar quartz heater within the heating cavity and positioned above the conveyer and being located closer to said second opening than it is to said first opening, said second planar quartz heater generating infrared heat and directing it downwardly and substantially orthogonal to the conveyor, said second electrically powered planar quartz heater being displaced away from said first electrically powered planar quartz heater;
a third electrically cowered planar quartz heater within the heating cavity and positioned below the conveyer so that it is transversely displaced from both said first and second quartz heaters and generating infrared heat and directing it upwardly, said first, second and third quartz heaters being located and arranged with respect to each other such that said third planar quartz heater is not directly opposite of either of said first and second planar quartz heaters, with no perpendicular overlapping of any opposing heaters;
a controller, operatively coupled to at least one of the first, second and third quartz heaters, the controller being capable of controlling the amount of electrical power delivered to at least one of the first, second and third quartz heaters.

2. The oven of claim 1 wherein the controller is a controller that provides an adjustable duty-cycle A.C. voltage to at least one of the first, second and third quartz heaters.

3. The oven of claim 1 wherein the conveyor is a variable speed conveyor.

4. The oven of claim 1 wherein the controller is a controller that adjusts a direct current.

5. An oven for cooking food items comprising:
an oven housing defining a heating cavity, said oven housing having first and second opposing openings into the heating cavity;
a conveyor forming a loop that extends through at least one of said first opening and second opening;
a first, electrically powered planar quartz heater, within the heating cavity and positioned above the conveyer loop and being located closer to said first opening than it is to said second opening, said at least one planar quartz heater generating infrared heat and directing it downward to food items on the conveyer loop;
a second, electrically powered planar quartz heater within the heating cavity and positioned above the conveyer loop and being located closer to said second opening than it is to said first opening, said at least one planar quartz heater generating infrared heat and directing it downward to food items on the conveyer;
a third electrically powered planar quartz heater within the heating cavity and positioned within the conveyer loop, transversely displaced from both said first and second planar quartz heaters, generating infrared heat and directing it upwardly, said first, second and third quartz heaters being located and arranged with respect to each other such that said third planar quartz heater is not directly opposite either of said first and second planar quartz heaters, with no perpendicular overlapping of any opposing heaters; and
a controller, operatively coupled to at least one of the first, second and third quartz heaters, the controller being capable of controlling the amount of electrical power delivered to at least one of the first, second and third quartz heaters.

6. The oven of claim 5 wherein the controller is a controller that adjusts the duty cycle of an AC electrical power source, and which provides an adjustable duty-cycle A.C. voltage to at least one of the first, second and third quartz heaters.

7. The oven of claim 5 wherein the controller is a controller that adjusts a direct current to at least one of the first, second and third quartz heaters.

8. An oven for cooking food items comprising:
an oven housing defining a heating cavity, said oven housing having first and second opposing openings into the heating cavity;
a wire variable speed conveyor within the heating cavity and forming a loop, that extends through said first opening and through the second opening;
a first planar electrically-powered quartz heater, within the heating cavity and positioned within the conveyer loop and being located closer to said first opening than it is to said second opening said at least one planar electrically-powered quartz heater generating infrared heat and directing it upward toward the conveyer;
a second planar electrically-powered quartz heater within the heating cavity and positioned within the conveyer loop and away from said first planar quartz heater such that said second planar quartz heater is closer to said second opening than it is to said first opening said second quartz heater generating infrared heat and directing it upward toward the conveyer;
a third electrically powered planar quartz heater within the heating cavity and positioned above the conveyer loon so that it is transversely displaced from both said first and second quartz heaters and generating infrared heat and directing it downwardly, said first, second and third quartz heaters being located and arranged with respect to each other such that said third planar quartz heater is not directly opposite either of said first and second planar quartz heaters, with no perpendicular overlapping of any opposing heaters; and a controller, operatively coupled to at least one of the first, second and third quartz heaters, the controller being capable of controlling the amount of electrical power delivered to at least one of the first, second and third quartz heaters.

9. The oven of claim 8 wherein the controller is a controller that adjusts the duty cycle of an AC electrical power source, and which provides an adjustable duty-cycle A.C. voltage to at least one of the first, second and third quartz heaters.

10. The oven of claim 8 wherein the controller is a controller that adjusts a direct current to at least one of the first, second and third quartz heaters.

11. An oven for cooking food items comprising:

an oven housing defining a heating cavity, said oven housing having first and second opposing openings into the heating cavity;

a wire variable speed conveyor forming a loop that extends through the heating cavity;

a first planar electrically-powered quartz heater, within the heating cavity and positioned below the conveyer loop and being located closer to said first opening than it is to said second opening, said first planar electrically-powered quartz heater generating infrared heat and directing it upward toward the conveyer;

a second planar electrically-powered quartz heater within the heating cavity and positioned below the conveyer loop and being located closer to second opening than it is to said first opening, said second planar electrically-powered quartz heater being displaced from said first quartz heater and generating infrared heat and directing it upward onto food items on the conveyer;

a third planar electrically-powered quartz heater within the heating cavity and positioned above the conveyor loop and transversely displaced from both said first and second quartz heaters, said third planar quartz heater generating and directing infrared head downward onto the conveyor, said first, second and third quartz heaters being located and arranged with respect to each other such that said third planar quartz heater is not directly opposite either of said first and second planar quartz heaters with no perpendicular overlapping of any opposing heaters; and a controller, operatively coupled to at least one of the first, second and third quartz heaters, the controller being capable of controlling the amount of electrical power delivered to at least one of the first, second and third quartz heaters.

12. The oven of claim 11 wherein the controller is a controller that adjusts the duty cycle of an AC electrical power source, and which provides and adjustable duty-cycle A.C. voltage to at least one of the first, second and third quartz heaters.

13. The oven of claim 11 wherein the controller is a controller that adjusts a direct current to at least one of the first, second and third quartz heaters.

14. An oven for cooking food items comprising:

an oven housing defining a heating cavity, said oven housing having first and second opposing openings into the heating cavity;

a wire variable speed conveyor forming a loop, that extends through the heating cavity, a first planar electrically-powered quartz heater, within the heating cavity and positioned within the conveyer loop and being located closer to said first opening than it is to said second opening, said first planar electrically-powered quartz heater generating infrared heat and directing it downward onto food items on the conveyer;

a second planar electrically-powered quartz heater within the heating cavity and positioned within the conveyer loop and being located closer to said second opening than it is to said first opening, said second planar electrically-powered quartz heater generating infrared heat and directing it upward onto food items on the conveyer;

a third planar electrically-powered quartz heater within the heating cavity and positioned above the conveyor loop and transversely displaced from both said first and second quartz heaters, said third planar quartz heater generating and directing infrared head downward onto the conveyor, said first, second and third quartz heaters being located and arranged with respect to each other such that said third planar quartz heater is not directly opposite either of said first and second planar quartz heaters, with no perpendicular overlapping of any opposing heaters; and a controller, operatively coupled to at least one of the first, second and third quartz heaters, the controller being capable of controlling the amount of electrical power delivered to at least one of the first, second and third quartz heaters.

15. The oven of claim 14 wherein the controller is a controller that adjusts the duty cycle of an AC electrical power source, and which provides an adjustable duty-cycle A.C. voltage to at least one of the first, second and third quartz heaters.

16. The oven of claim 14 wherein the controller is a controller that adjusts a direct current to at least one of the first, second and third quartz heaters.

* * * * *